United States Patent
Lin et al.

(10) Patent No.: US 10,288,869 B2
(45) Date of Patent: May 14, 2019

(54) REFLECTING MICROSCOPE MODULE AND REFLECTING MICROSCOPE DEVICE

(71) Applicant: Aidmics Biotechnology Co., Ltd., Taipei (TW)

(72) Inventors: Cheng-Ming Lin, Taipei (TW); Chang-Yu Chen, Taipei (TW); Tsun-Chao Chiang, Taipei (TW); Shu-Sheng Lin, Taipei (TW)

(73) Assignee: AIDMICS BIOTECHNOLOGY CO., LTD., Taipei (TW)

( * ) Notice: Subject to any disclaimer, the term of this patent is extended or adjusted under 35 U.S.C. 154(b) by 54 days.

(21) Appl. No.: 15/420,879

(22) Filed: Jan. 31, 2017

(65) Prior Publication Data

US 2017/0227758 A1   Aug. 10, 2017

(30) Foreign Application Priority Data

Feb. 5, 2016   (CN) .......................... 2016 1 0083284
Jan. 20, 2017  (CN) .......................... 2017 1 0040411

(51) Int. Cl.
| G02B 17/00 | (2006.01) |
| G02B 25/00 | (2006.01) |
| G02B 25/02 | (2006.01) |
| G02B 21/00 | (2006.01) |

(52) U.S. Cl.
CPC ....... *G02B 25/002* (2013.01); *G02B 21/0008* (2013.01); *G02B 25/02* (2013.01)

(58) Field of Classification Search
CPC ...... G02B 25/002; G02B 25/02; G02B 17/08; G02B 17/086; G02B 17/0892; G01N 21/03; G01N 2021/0367; G03F 7/70225; F21Y 2101/02

USPC .......................................................... 359/726
See application file for complete search history.

(56) References Cited

U.S. PATENT DOCUMENTS

| 5,571,721 A * | 11/1996 | Turner .................. B01L 3/5085 359/398 |
| 6,052,224 A | 4/2000 | Richardson |
| 6,300,140 B1 | 10/2001 | Robinson et al. |
| 9,057,702 B2 | 6/2015 | Ozcan et al. |
| 9,594,241 B2 * | 3/2017 | Schoen |

(Continued)

FOREIGN PATENT DOCUMENTS

| CN | 202886724 U * | 4/2013 |
| CN | 202886724 U | 4/2013 |

(Continued)

*Primary Examiner* — William R Alexander
*Assistant Examiner* — Henry A Duong
(74) *Attorney, Agent, or Firm* — Muncy, Geissler, Olds & Lowe, P.C.

(57) ABSTRACT

A reflecting microscope module cooperating with an image capturing module includes a housing, a lens and a sample adhesive substance. The housing has a sample inspecting surface located on one side of the housing opposite to the image capturing module. The lens is disposed in the housing and the sample adhesive substance is detachably disposed on a bottom of the housing. The sample adhesive substance adjacently connected to the sample inspecting surface includes a substrate and a glue layer. The glue layer is integrally combined with the substrate to form one piece. A reflecting microscope device is also disclosed.

20 Claims, 17 Drawing Sheets

(56) References Cited

U.S. PATENT DOCUMENTS

| | | | |
|---|---|---|---|
| 2005/0173059 A1* | 8/2005 | Ringleben | B01L 3/5085 156/291 |
| 2010/0290110 A1* | 11/2010 | Liang | G02B 21/0008 359/385 |
| 2011/0294543 A1 | 12/2011 | Lapstun et al. | |
| 2012/0157160 A1 | 6/2012 | Ozcan et al. | |
| 2014/0176787 A1 | 6/2014 | Sheng et al. | |
| 2014/0267670 A1 | 9/2014 | Tipgunlakant et al. | |
| 2014/0267882 A1 | 9/2014 | O'Neill et al. | |
| 2016/0147057 A1 | 5/2016 | Nagayama et al. | |

FOREIGN PATENT DOCUMENTS

| | | |
|---|---|---|
| CN | 203883900 U | 10/2014 |
| CN | 204500954 U | 7/2015 |
| JP | 2004-085272 A | 3/2004 |
| JP | 2014-503822 A | 2/2014 |
| JP | 2015-055750 A | 3/2015 |
| JP | 2015/057626 A | 3/2015 |

\* cited by examiner

REFLECTING MICROSCOPE MODULE AND REFLECTING MICROSCOPE DEVICE

CROSS REFERENCE TO RELATED APPLICATIONS

This Non-provisional application claims priority under 35 U.S.C. § 119(a) on Patent Application No(s). 201610083284.4 filed in People's Republic of China on Feb. 5, 2016, and 201710040411.7 filed in People's Republic of China on Jan. 20, 2017, the entire contents of which are hereby incorporated by reference.

BACKGROUND OF THE INVENTION

Field of Invention

The invention relates to a reflecting microscope module and a reflecting microscope device.

Related Art

Microscopes may be classified into a transmitting microscope and a reflecting microscope (also referred to as a metallographic microscope). The transmitting microscope is usually used to observe a transparent or very thin sample object, so that the light ray of the light source can directly penetrate through the sample object and then enter the microscope. So, the transmitting microscope is frequently used to observe the biological tissue. On the other hand, the reflecting microscope is frequently used to observe opaque sample objects, such as the metal and mineral, and is frequently applied to the engineering and material fields. The light source of the reflecting microscope needs to be formed into polarized light through a polarizer, so that some light rays are turned vertically downward, and then pass through the lens and are focused on the surface of the sample object, which reflects the light rays. The light rays are magnified by the objective lens, polarizer, flat glass and ocular lens, and then enter the observer's eye. So, the reflecting microscope can be used to observe the property of the surface of the sample object.

However, the objective lens, polarizer, flat glass and ocular lens have to be disposed inside the reflecting microscope. More particularly, the polarizer must have the specific angle configuration, so that the reflecting microscope has the larger volume. Meanwhile, the mechanism of the reflecting microscope is more complicated and is hard to be carried, and is thus frequently placed in the laboratory, and the reflecting microscope is usually operated by the professional. In addition, the reflecting microscope is mainly applied to the observation of the property of the surface of the sample object. The user feels inconvenient if the to-be-observed sample object cannot be observed until it is sampled to the laboratory, and it is hard to be applied to the non-professional ordinary user. In other words, the reflecting microscope is usually used to observe the property of the surface of the sample object, and thus further has the requirement to be carried with the user. In addition, if a suitable sample adhesive substance cannot be selected for the user's collected sample and easily mounted on the microscope for observation, the flexibility and the resilience of the microscope adapted to the sample adhesive substance is significantly reduced, and the fun of use of the user in operating the microscope cannot be enhanced.

Therefore, the reflecting microscope must be light, handy and portable, the sample should be obtained by the simple and rapid sampling method, and the sampled sample should also be easily fixed to and disposed on the microscope to facilitate the user's observation. Thus, the difficulty of operating the microscope can be lowered so that the user can easily and instinctively get started without the execution of the inspection-associated operation by only the professional. In addition, the user can use the suitable sample adhesive substance to easily carry the collected sample and easily mount the sample adhesive substance onto the microscope, thereby enhancing the flexibility and the resilience of the microscope adapted to the sample adhesive substance while enhancing the user's will of operating the microscope.

SUMMARY OF THE INVENTION

In view of the above-mentioned subjects, an object of the invention is to provide a light, handy and portable reflecting microscope module and a reflecting microscope device. The structural design, in which a sample adhesive substance is detachably disposed on a bottom of a housing of the reflecting microscope module so that the sample adhesive substance is adjacently connected to the sample inspecting surface, is used so that the sample can be easily and rapidly fixed to and disposed on the microscope to facilitate the user's observation. Thus, the objects of lowering the difficulty of operating the microscope, making the user easily and instinctively get started and enhancing the user's will of operating the microscope can be achieved.

To achieve the above objective, the present invention provides a reflecting microscope module cooperating with an image capturing module. The reflecting microscope module comprises a housing, a lens and a sample adhesive substance. The housing has a sample inspecting surface located on one side of the housing opposite to the image capturing module. The lens is disposed in the housing. The sample adhesive substance is detachably disposed on a bottom of the housing, is adjacently connected to the sample inspecting surface and comprises a substrate and a glue layer integrally combined with the substrate to form one piece.

In one embodiment, a light ray is reflected by the sample adhesive substance and then penetrates through the lens and reaches the image capturing module.

In one embodiment, a light ray outputted from a light source is inputted from a light input surface of the lens, and is outputted from a light output surface of the lens to the sample inspecting surface.

In one embodiment, the reflecting microscope module further comprises a light emitting assembly which has a light source and is disposed adjacently to the lens.

In one embodiment, the light source of the light emitting assembly is an annular light emitting source.

In one embodiment, the reflecting microscope module further comprises a light-guiding element disposed outside the housing. The light-guiding element has a light input portion and a light output portion, and the light output portion is disposed adjacently to the lens, so that the light input portion receives a light ray and the light output portion emits the light ray to the lens.

In one embodiment, when the reflecting microscope module is not used in conjunction with a light source, and the housing has at least one hole to make an external light ray travel into the housing and onto the sample inspecting surface.

In one embodiment, the substrate has a concave portion and an extension, the extension is adjacently connected to the concave portion, and the glue layer is disposed on one side of the substrate having the concave portion.

In one embodiment, the sample adhesive substance further comprises a carrier, and the sample adhesive substance is detachably adhered to a surface of the carrier, so that the concave portion and the surface form a chamber.

In one embodiment, an adhesive property of the glue layer located on the concave portion is lower than an adhesive property of the glue layer located on the extension.

In one embodiment, at least a partial area of the sample adhesive substance is a light-permeable area.

In one embodiment, the extension is an opaque area, and the concave portion is a light-permeable area.

In one embodiment, the concave portion has a light obstructing spot.

In one embodiment, the sample adhesive substance is a sticker.

In one embodiment, the carrier is a slide, a plastic sheet, a resin sheet, a light-permeable sheet or an opaque sheet.

In one embodiment, the housing and the sample adhesive substance are detachably fixed and connected together.

In one embodiment, the reflecting microscope module further comprises a detachable seat cover, and the housing and the detachable seat cover are connected together through a thread, an engaging unit or a magnetic unit by way of screwing, engaging or magnetic attracting.

In one embodiment, the bottom has a sample adhesive substance insertion slot, and the sample adhesive substance is disposed on the bottom through the sample adhesive substance insertion slot.

In one embodiment, the sample adhesive substance insertion slot has at least one limiting strip.

In one embodiment, the limiting strip is provided with at least one magnetic unit, the sample adhesive substance is detachably adhered to a carrier, and the sample adhesive substance adhered to the carrier and the sample adhesive substance insertion slot are connected together by way of magnetic attracting through the limiting strip provided with the magnetic unit.

In one embodiment, the sample adhesive substance insertion slot has a transparent area or an opening area.

In one embodiment, the bottom has two sample adhesive substance fixing structures.

In one embodiment, the sample adhesive substance fixing structure is a magnetic unit, the sample adhesive substance is detachably adhered to a carrier, and the sample adhesive substance adhered to the carrier is magnetically attracted to the bottom through the magnetic unit.

In one embodiment, the sample adhesive substance is detachably adhered to a carrier, and at least one of the housing and the carrier is provided with a magnetic unit, so that the sample adhesive substance adhered to the carrier and the bottom can be magnetically attracted to each other.

In one embodiment, an outer surface of the housing has a slope.

In one embodiment, an outer surface of the housing has a plurality of holes.

In one embodiment, the reflecting microscope module further comprises a connector disposed on the housing and connected to the image capturing module.

In one embodiment, the connector comprises a connection clip and a pivot.

In one embodiment, a shortest distance from the sample inspecting surface to the lens ranges between 0.1 mm to 10.0 mm.

In one embodiment, the substrate has a smooth surface without a concave portion.

To achieve the above objective, the present invention also provides a reflecting microscope device. The reflecting microscope device comprises an image capturing module and the aforesaid reflecting microscope module.

In summary, the reflecting microscope module of the invention cooperates with an image capturing module. The reflecting microscope module comprises a housing, a lens and a sample adhesive substance. The housing has a sample inspecting surface located on one side of the housing opposite to the image capturing module. The lens is disposed inside the housing. The sample adhesive substance is detachably disposed on a bottom of the housing, is adjacently connected to the sample inspecting surface and comprises a substrate and a glue layer. The glue layer is combined with the substrate to form one piece. The structural design of the invention, in which a sample adhesive substance is detachably disposed on a bottom of a housing of the reflecting microscope module so that the sample adhesive substance is adjacently connected to the sample inspecting surface, is used so that the sample can be easily and rapidly fixed to and disposed on the microscope to facilitate the user's observation. Thus, the objects of lowering the difficulty of operating the microscope, making the user easily and instinctively get started and enhancing the user's will of operating the microscope can be achieved.

DETAILED DESCRIPTION OF THE INVENTION

A reflecting microscope module and a reflecting microscope device according to preferred embodiments of the invention will be described with reference to the accompanying drawings, wherein the same references relate to the same elements.

Figure 1A:
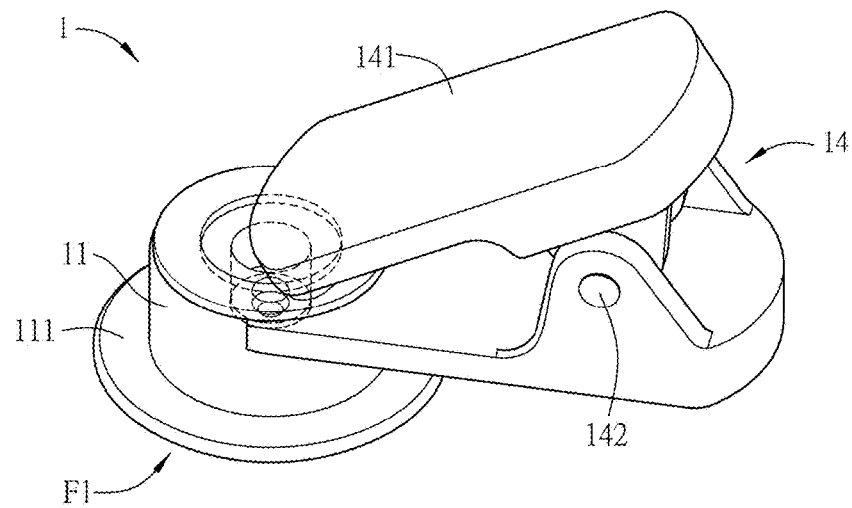
FIG. 1A is a pictorial outlook view showing a reflecting microscope module according to an embodiment of the invention.
Figure 1B:
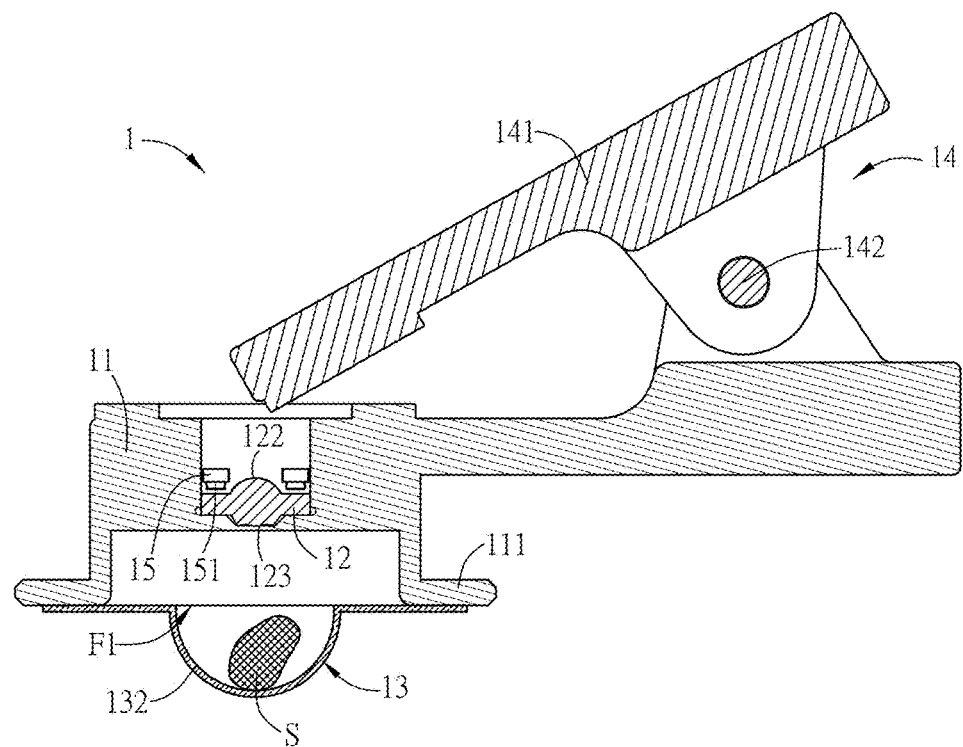
FIG. 1B is a schematically cross-sectional view showing the reflecting microscope module of FIG. 1A.
Figure 1C:
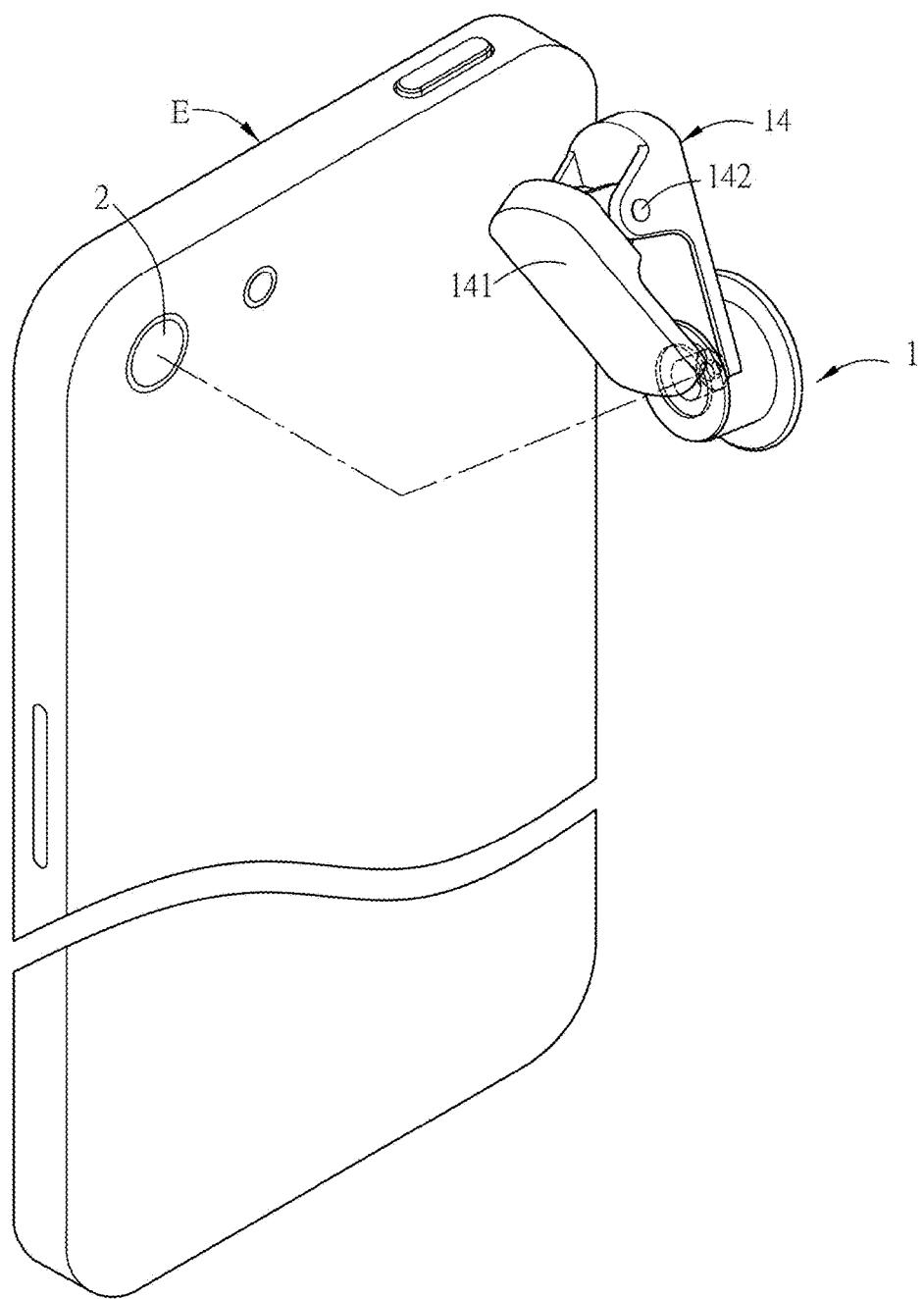
FIGS. 1C to 1D are schematic views showing the reflecting microscope module of FIG. 1A and an image capturing module before and after being assembled.
Figure 1D:
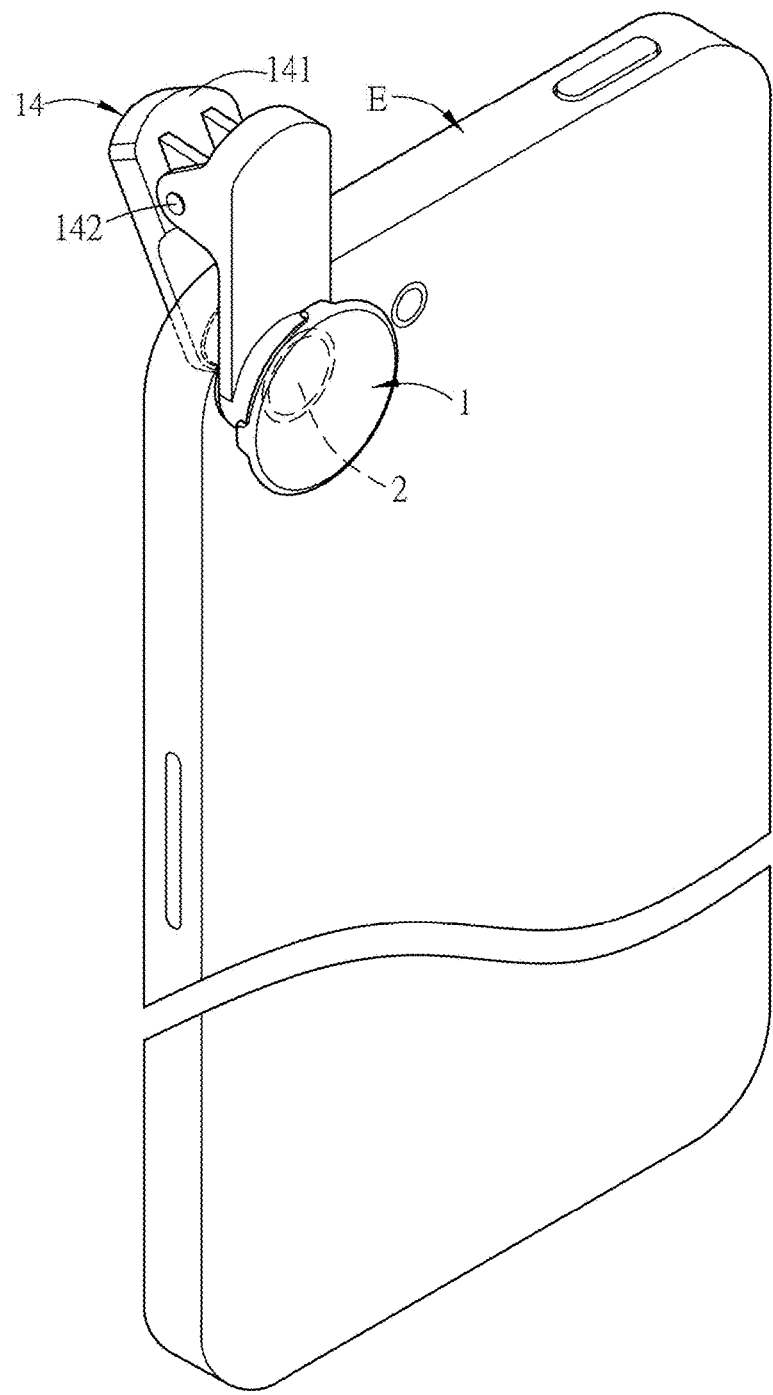

FIG. 1A is a pictorial outlook view showing a reflecting microscope module according to an embodiment of the invention. FIG. 1B is a schematically cross-sectional view showing the reflecting microscope module of FIG. 1A. FIGS. 1C to 1D are schematic views showing the reflecting microscope module of FIG. 1A and an image capturing module before and after being assembled. Please refer to FIGS. 1A to 1D concurrently, a reflecting microscope module 1 comprises a housing 11, a lens 12 and a sample adhesive substance 13 (the sample adhesive substance 13 is only depicted in the side view of FIG. 1B). In addition, the reflecting microscope module 1 of this embodiment may further comprise a connector 14 disposed on the housing 11. As shown in FIGS. 1C and 1D, the reflecting microscope module 1 of this embodiment can cooperate with an image capturing module 2 through the connector 14. The connector 14 comprises a connection clip 141 and a pivot 142. The user presses one end of the connection clip 141 in conjunction with the pivot to open one side of the connection clip 141 near the housing 11, and clips the reflecting microscope module 1 onto an electronic device E. In another implementation aspect, the connector 14 may also be an adhesive layer but not the connection clip, wherein the adhesive layer may be a pressure sensitive adhesive, which is an adhesive agent sensitive to the pressure and can be adhered repeatedly, so that the reflecting microscope module 1 can be repeatedly adhered to the electronic device E through the adhesive layer (pressure sensitive adhesive) 14.

The electronic device E may be, for example, a mobile communication device, a smart mobile phone, a tablet computer, a camera, a driving recorder, a camcorder, a notebook computer, a microscope or a wearable electronic device with a photographing function, and this embodiment is described by taking the mobile communication device as an example. That is, the reflecting microscope module 1 of this embodiment can directly cooperate with the image capturing module 2 of the electronic device E through the connector 14.

Referring to FIG. 1B, the housing 11 has a sample inspecting surface F1 located on one side of the housing 11 opposite to the image capturing module 2, and further has a bottom 111 similarly located on one side of the housing 11 opposite to the image capturing module 2 (i.e., one side near the sample adhesive substance 13). In addition, the lens 12 is disposed inside the housing 11. The sample adhesive substance 13 having the adhesive property can stick a to-be-observed sample S, and then be detachably disposed on the bottom 111 of the housing 11 so that the sample adhesive substance 13 is adjacently connected to the sample inspecting surface F1. After the sample adhesive substance 13 is adjacently connected to the sample inspecting surface F1, the imaged sample of the to-be-observed sample S after being magnified by the reflecting microscope module 1 can be observed through the imaging of the lens 12 and the image capturing module 2. In addition, the housing 11 of this embodiment is detachably fixed and connected to the sample adhesive substance 13, and the other technology relating to the sample adhesive substance 13 will be described later.

It is to be specified that the sample inspecting surface F1 mentioned in this embodiment may be a physical surface or a virtual surface. Regarding the physical surface, when the sample adhesive substance 13 and the housing 11 contact each other, the sample inspecting surface F1 is substantially the surface of the side of the housing 11 opposite to the image capturing module 2. Regarding the virtual surface, as shown in FIG. 1B, when a minor distance is present between the to-be-observed sample S and the housing 11, the sample inspecting surface F1 is the surface of the bottom 111 adjacently connected to the sample adhesive substance 13. In addition, this embodiment does not restrict the to-be-observed sample, and the to-be-observed sample S and its size depicted in the drawings are only for the illustrative purpose only but not the limitative purpose.

Figure 1E:
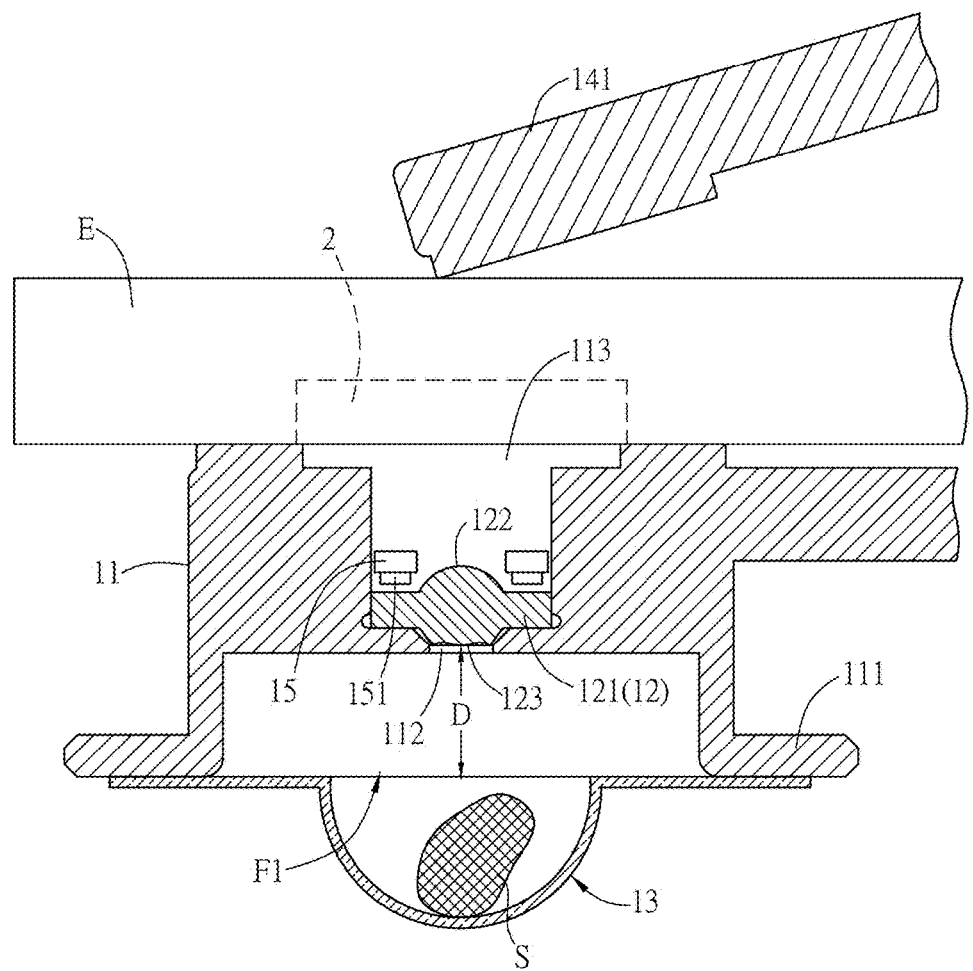
FIG. 1E is a schematically cross-sectional view showing the reflecting microscope module of FIG. 1A upon sample observation.

FIG. 1E is a schematically cross-sectional view showing the reflecting microscope module of FIG. 1A upon sample observation. Referring to FIG. 1E, the lens 12 of this embodiment is an aspheric lens of a lenticular lens. In the condition when the high magnification or the effect of the depth of field needs to be presented, the shortest distance D from the sample inspecting surface F1 to the surface of the lens 12 ranges between 0.1 mm and 10 mm, may range between 0.1 mm and 3.0 mm in an ordinary condition, preferably ranges between 0.3 mm and 2.0 mm and more preferably ranges between 0.5 mm and 1.2 mm. Thus, the magnification power of the reflecting microscope module 1 may range between 100 and 200 times. In this embodiment, the lens 12 has a wing 121 located on a periphery of the lens 12. That is, the middle portion of the lens 12 is an aspheric lens with two convex surfaces, and the peripheral portion of the lens 12 is a flat wing 121. In addition, the lens 12 used in the reflecting microscope module in another implementation aspect may also not be the aspheric lens of the lenticular lens, may be a spherical lens, a single-convex lens, a single-concave/biconcave lens or a lens set composed of multiple lenses, and may be determined according to the user's observation requirement, so the invention is not restricted thereto.

In addition, the reflecting microscope module 1 of this embodiment may further comprise a light emitting assembly 15, which has a light source 151 and is disposed adjacently to the lens 12. The light source 151 may be a light emitting diode, a laser diode or a fluorescent lamp. The light source 151 of this embodiment is located between the image capturing module 2 and the lens 12. Specifically, the light source 151 of this embodiment is disposed inside the housing 11, and located on the side of the lens 12 near the image capturing module 2. In addition, the light source 151 of the light emitting assembly 15 in another implementation aspect may be an annular light emitting source, and similarly disposed adjacently to the lens 12 to output the light ray. The light ray outputted from the light source 151 is reflected by the sample adhesive substance 13, and then the light ray can penetrate through the lens 12 and reach the image capturing module 2.

More specifically, with the arrangement relationship between the lens 12 and the light emitting assembly 15, the light ray emitted from the light source 151 can be inputted from a light input surface 122 of the lens 12, and outputted from a light output surface 123 of the lens 12 to the sample inspecting surface F1, the sample adhesive substance 13 and the to-be-observed sample S. In addition, the housing 11 of this embodiment has a light output hole 112 and an opening 113. The light output hole 112 is located on the side near the sample inspecting surface F1, the light output hole 112 in this embodiment corresponds to the opening or hole of the bottom 111, and the opening 113 is located on the side near the image capturing module 2. Thus, the overall path of the light ray emitted from the light source 151 is such that the light ray is inputted from the light input surface 122 of the lens 12, and outputted from the light output surface 123. Then, the light ray is emitted to the sample inspecting surface F1, the sample adhesive substance 13 and the to-be-observed sample S through the light output hole 112. Next, the light ray is reflected by the sample adhesive substance 13 and the sample inspecting surface F1, inputted from the light output surface 123 of the lens 12, and outputted from the light input surface 122. Then, the light ray passes through the opening 113 and enters the lens of the image capturing module 2. After the lens of the image capturing module 2 obtains the magnified sample image, the image capturing module 2 executes the image processing procedure, and a display unit of the electronic device E displays the sample image. That is, the sample image magnified by the reflecting microscope module 1 allows the user to directly observe the sample image magnified by the reflecting microscope module 1 one the end of the electronic device E. Thus, the reflecting microscope module 1 of this embodiment pertains to a reflecting microscope (metallographic microscope) due to the above-mentioned optical path architecture.

Preferably, the light source 151 of this embodiment is disposed in the housing 11, and the position of the light source 151 abuts upon the wing 121 of the lens 12, wherein the wing 121 is the portion unassociated with imaging, so this embodiment does not restrict the length of the wing 121. The wing 121 is disposed on the periphery of the lens 12, so the light source 151 is disposed around the middle convex portion of the lens 12. The above-mentioned positional configuration enables the light ray emitted from the light source 151 to enter the lens 12 from the wing 121 and to diffuse thereinside, and then the light output surface 123 of the lens 12 focuses the light ray onto the focus, wherein the main optical axis of the light source 151 is different from the optical axis of the lens 12, and is disposed substantially in parallel.

In this embodiment, the light source 151 may be a visible light source or an invisible light source. The visible light source may serve as the light source for the observation of most types of samples. The invisible light source is, for example, an infrared light source that may be used in jewelry identification, or an ultraviolet light source that may be used in recognizing the anti-counterfeit mark, such as the banknote inspection. In addition, the invention also does not restrict the number of the light source(s) 151. For example, the light emitting assembly 15 may have a plurality of light sources. Thus, the reflecting microscope module 1 may have different aspects of light sources 151 and different numbers of light sources according to the requirements and different types of samples to be observed.

The detailed technological contents of the sample adhesive substance and associated members of the embodiment will be further described in the following.

Figure 1F:
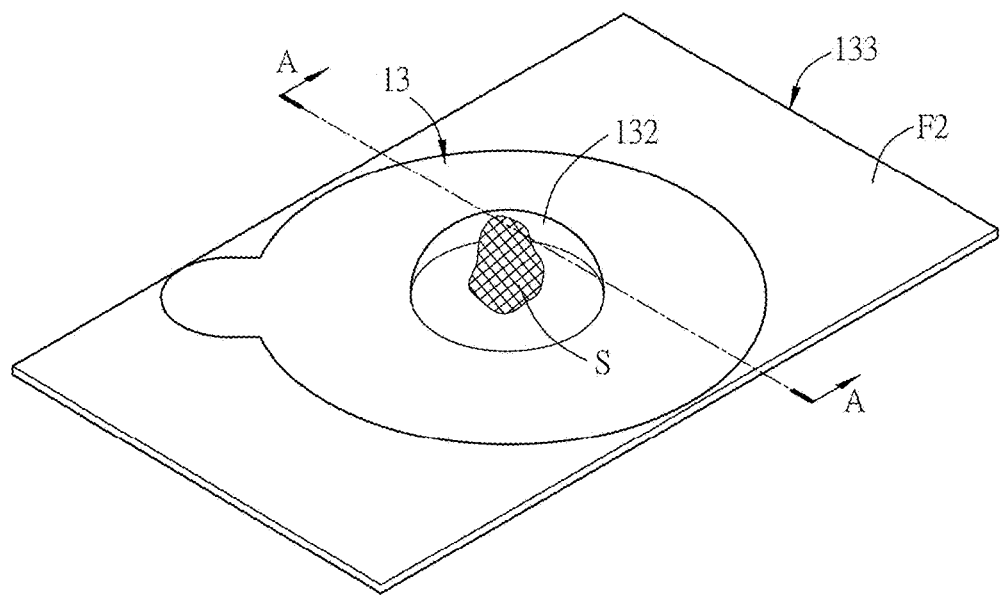
FIG. 1F is a schematic outlook view showing a sample adhesive substance of the reflecting microscope module of FIG. 1A.
Figure 1G:
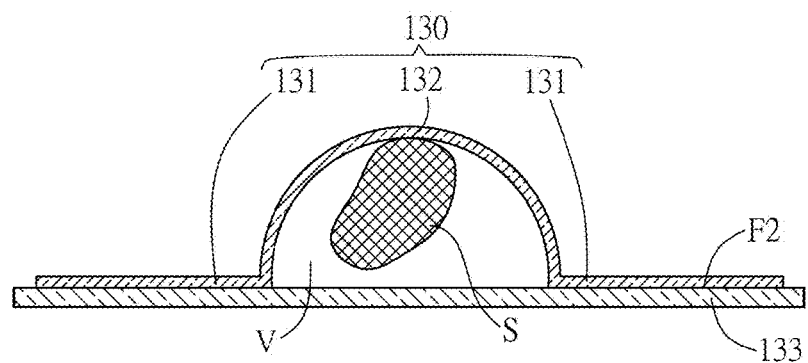
FIG. 1G is a schematically cross-sectional view taken along a line A-A of FIG. 1F.
Figure 1H:
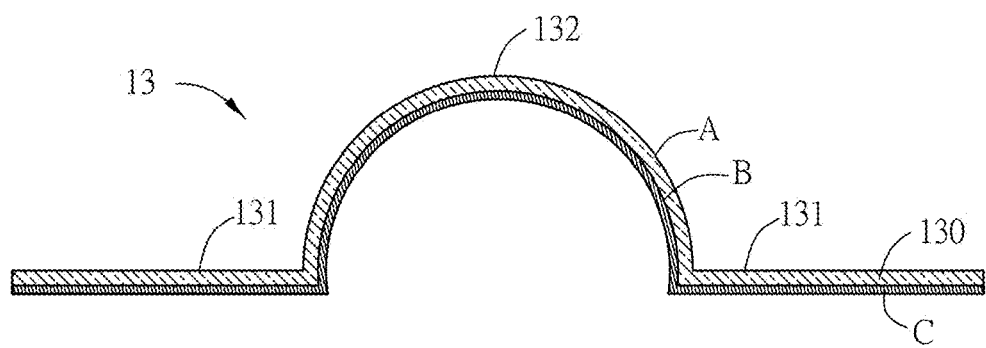
FIG. 1H is a schematic view showing a detailed structure of the sample adhesive substance of FIG. 1A.

Please refer to FIGS. 1F to 1H. FIG. 1F is a schematic outlook view showing the sample adhesive substance of the reflecting microscope module of FIG. 1A. FIG. 1G is a schematically cross-sectional view taken along a line A-A of FIG. 1F. FIG. 1H is a schematic view showing a detailed structure of the sample adhesive substance of FIG. 1A.

Referring to FIGS. 1F to 1H concurrently, the sample adhesive substance 13 may further cooperate with a carrier 133, and the reflecting microscope module of each of the following embodiments. The carrier 133 may have a sample supporting surface F2. The carrier 133 may be a slide, a plastic sheet, a resin sheet, a light-permeable sheet or an opaque sheet. The sample adhesive substance 13 comprises a substrate 130 and a glue layer C (Please refer to FIGS. 1G and 1H). The substrate 130 has a first surface A and a second surface B opposite to each other. The glue layer C is disposed on the second surface B of the substrate 130. The substrate 130 has an extension 131 and a concave portion 132. The extension 131 is adjacently connected to the concave portion 132. The adhesive property of the glue layer C located on the sample adhesive substance 13 of the concave portion 132 is lower than the adhesive property of the glue layer C located on the extension 131. The glue layer C is disposed on the one side (second surface B) of the substrate 130 having the concave portion 132, and is combined with the substrate 130 to form one piece. In addition, the substrate 130 and the glue layer C of this embodiment are light-permeable, and have the transmission rate greater than 90%.

One side of the sample adhesive substance 13 located on the sample supporting surface F2 has the adhesive property. When the extension 131 of the sample adhesive substance 13 is attached to the carrier 133, the concave portion 132 and the sample supporting surface F2 may form a chamber V for accommodating a to-be-observed sample S. The user only needs to use the concave portion 132 of the sample adhesive substance 13 to accommodate or stick the to-be-observed sample S, and attach the sample adhesive substance 13 onto the carrier 133 to complete the preparation of the microscope sample. Thus, the processes of preparing the conventional microscope sample are significantly simplified.

The chamber V can close or seal a to-be-observed sample S, and prevent the liquid from leaking outside. The to-be-observed sample S may be a microbe, a cell, an arthropod, mineral powder or the like. In addition, the to-be-observed sample S is not restricted to a liquid sample or a live sample. For example, the user can use the concave portion 132 of the sample adhesive substance 13 to stick a live insect or to accommodate a liquid specimen, and then attach the extension 131 of the sample adhesive substance 13 to the sample supporting surface F2 of the carrier 133 to encapsulate the live insect or the liquid specimen in the chamber V. Because the adhesive property of the concave portion 132 is lower than the adhesive property of the extension 131, the smaller live insect still can move in the chamber V and is free from be crushed by the sample adhesive substance 13. If the user wants to keep the to-be-observed sample S, the sample adhesive substance 13 can be torn off the carrier 133 and attached to another plastic film or sticker for the purpose of collection.

In another implementation aspect, the user may also keep the to-be-collected sample into a paper card, so the sample adhesive substance 13 may also be a sample paper card. Because the sample paper card is directly used, the user needs not to use the carrier. By detachably disposing the sample paper card on the bottom of the housing, the sample paper card is adjacently connected to the sample inspecting surface, and the imaged sample of the to-be-observed sample, which is magnified by the reflecting microscope module, on the sample paper card can be observed by the imaging of the lens and the image capturing module.

In addition, the reflecting microscope module of this embodiment may further cooperate with different aspects of sample adhesive substances and the above-mentioned carriers.

Figure 2A:
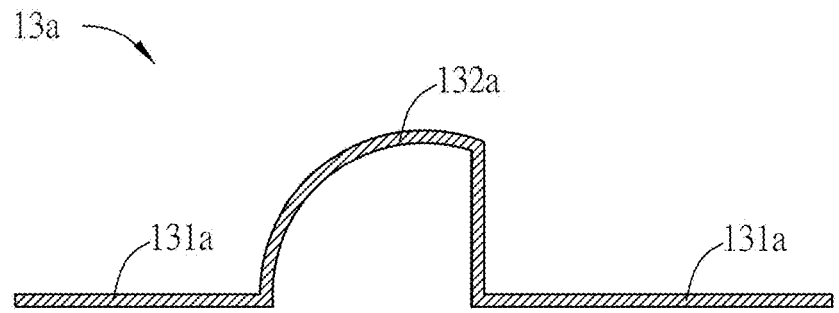
FIGS. 2A and 2B are schematically cross-sectional views showing modified aspects of a concave portion of a sample adhesive substance according to an embodiment of the invention.
Figure 2B:
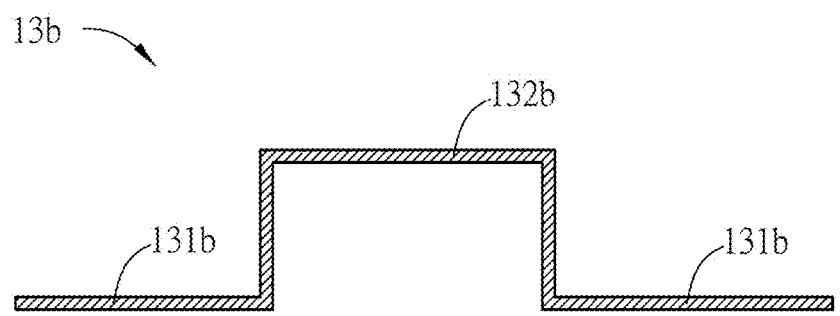

FIGS. 2A and 2B are schematically cross-sectional views showing modified aspects of a concave portion of a sample adhesive substance according to an embodiment of the invention. Referring to FIGS. 1H, 2A and 2B, the sample adhesive substance 13/13a/13b has an extension 131/131a/131b and a concave portion 132/132a/132b. The sample adhesive substances 13, 13a and 13b may be stickers, tapes or resin films, and have ductility. Thus, the user can stamp the sample adhesive substance into different shapes of inwardly concave structures by way of stamping forming. For example, the concave portion 132 of FIG. 1H and the concave portion 132a of FIG. 2A may have different types of arced structures, and the concave portion 132b of FIG. 2B has a rectangular structure.

Figure 2C:
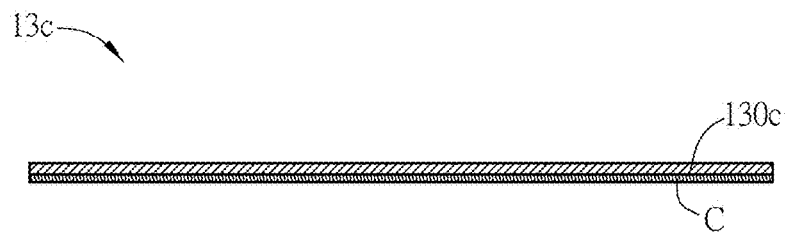
FIG. 2C is a schematically cross-sectional view showing a sample adhesive substance having a different modified aspect according to an embodiment of the invention.
Figure 2D:
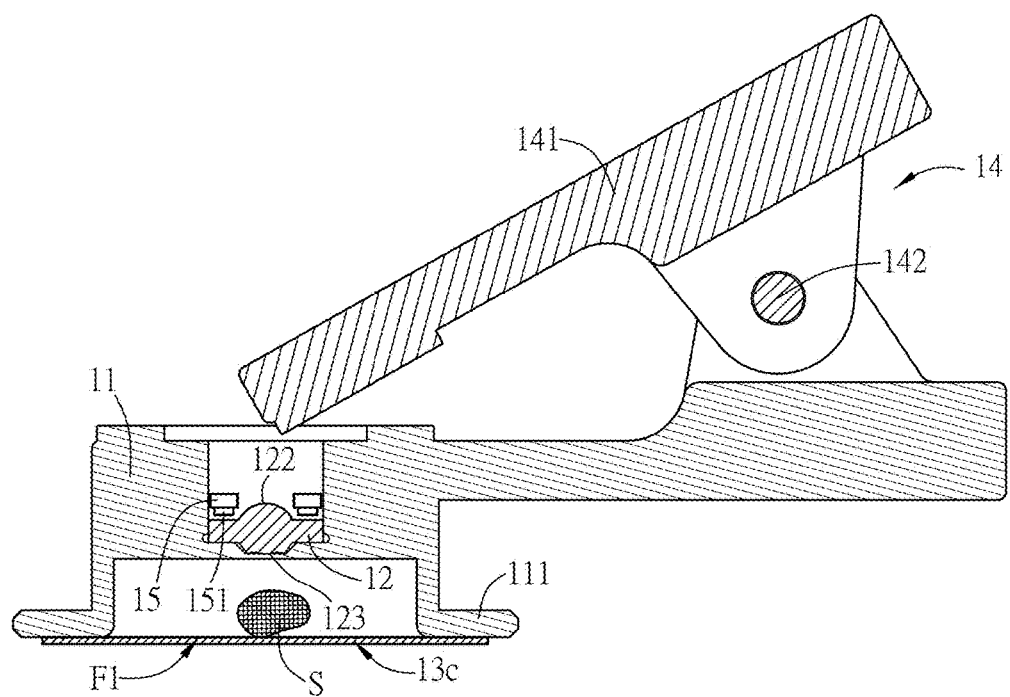
FIG. 2D is a schematically cross-sectional view showing a reflecting microscope module using the sample adhesive substance of the aspect of FIG. 2C.

FIG. 2C is a schematically cross-sectional view showing a sample adhesive substance having a different modified aspect according to an embodiment of the invention. FIG. 2D is a schematically cross-sectional view showing a reflecting microscope module using the sample adhesive substance of the aspect of FIG. 2C. Please refer to FIGS. 2C and 2D, the sample adhesive substance 13c in FIG. 2C similarly has a substrate 130c and a glue layer C, but is different from the sample adhesive substance 13a or 13b of FIG. 2A or 2B in that the substrate 130c of the sample adhesive substance 13c does not have the concave portion and the extension. Thus, in this aspect, the substrate 130c has a smooth surface without a concave portion, and the glue layer C may be disposed on one side of the smooth substrate 130c and is similarly combined with the substrate 130c to form one piece. In addition, the substrate 130c and the glue layer C also similarly have the high transmission rate so that the sample adhesive substance 13c is a fully flat sticking element with the high transmission rate.

In addition, the reflecting microscope module of FIG. 2D basically has the elements and relationships therebetween the same as those of the reflecting microscope module 1 of FIG. 1B except that the reflecting microscope module of FIG. 2D uses the fully flat sample adhesive substance 13c of FIG. 2C. Because the sample adhesive substance 13c has the adhesive property, it can stick a to-be-observed sample S and then is detachably disposed on the bottom 111 of the housing 11, so that the sample adhesive substance 13c is adjacently connected to the sample inspecting surface F1. After the sample adhesive substance 13c is adjacently connected to the sample inspecting surface F1, the imaged sample of the to-be-observed sample S, which is magnified by the reflecting microscope module 1, can be observed through the imaging of the lens 12 and the image capturing module 2.

In addition, other technical characteristics of the reflecting microscope module of FIG. 2D can be understood with reference to the associated descriptions of the reflecting microscope module 1, and detailed descriptions thereof will be omitted.

In the following embodiment, the sample adhesive substance 13 will be described by taking the sticker as an example. The sample adhesive substance 13 may be a light-permeable sticker having the transmission rate greater than 90%. Also, a light-obstructing treatment may be performed on a partial area of the sample adhesive substance 13 to form a dark field sticker.

Figure 3A:
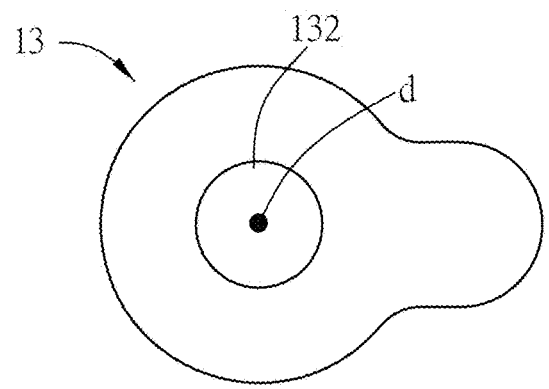
FIGS. 3A and 3B are schematic top views showing a sample adhesive substance according to an embodiment of the invention.
Figure 3B:
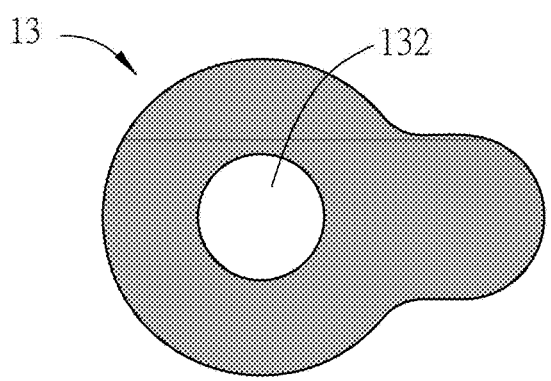

FIGS. 3A and 3B are schematic top views showing a sample adhesive substance according to an embodiment of the invention. Referring to FIG. 3A, the concave portion 132 of the sample adhesive substance 13 has a light obstructing spot d, and the area outside the light obstructing spot d is a light-permeable area. In the implementation aspect of FIG. 3A, the light obstructing spot d is a printed black spot and may be disposed on any position on the surface of the concave portion 132, and needs not to be disposed at the center position of the concave portion 132 as long as the imaging background of the to-be-observed sample S presents the dark field effect. The concave portion 132 of FIG. 3A may also be provided with multiple dispersed printed black spots to form the light-obstructing area. Thus, only one or multiple dispersed printed black spots need to be disposed on the original entire light-permeable concave portion 132 to form the light-obstructing area to let the refracted and scattered light rays travel to the to-be-observed sample S as possible as it can, so that the dark field effect can be achieved, and the resolution can be increased In another implementation aspect, as shown in FIG. 3B, the sample adhesive substance 13 only has one light-permeable area in the concave portion 132, and the other areas that are opaque areas. Thus, it is only necessary to configure the non-concave portion area of the sample adhesive substance 13 into the light-obstructing area, so that the sample adhesive substance 13 becomes a dark field sticker. In addition, the aspects of FIGS. 3A and 3B may also be used in a combined manner. With the configuration of the dark field sticker, the contrast between the sample itself and the background can be enhanced and the better imaging effect can be thus obtained.

With this, the reflecting microscope module of this embodiment can cooperate with an image capturing module. The reflecting microscope module comprises a housing, a lens and a sample adhesive substance. The housing has a sample inspecting surface. The sample inspecting surface is located on one side of the housing opposite to the image capturing module. The lens is disposed inside the housing. The sample adhesive substance is detachably disposed on a bottom of the housing, is adjacently connected to the sample inspecting surface and comprises a substrate and a glue layer. The substrate has a concave portion and an extension. The extension is adjacently connected to the concave portion. The glue layer is disposed on one side of the substrate having the concave portion, and is combined with the substrate to form one piece. The housing 11 of this embodiment and the sample adhesive substance 13 are detachably fixed and connected together, so that the sample adhesive substance is detachably disposed on a bottom of the housing of the reflecting microscope module. With the above-mentioned design, the sample can be easily and rapidly fixed and disposed onto the microscope to facilitate the user's observation. Thus, the difficulty of operating the microscope can be lowered so that the user can easily and instinctively get started. It is possible to prevent the difficulty in the user's operation from being increased, and the user's will of operating the microscope can be enhanced.

Figure 4A:
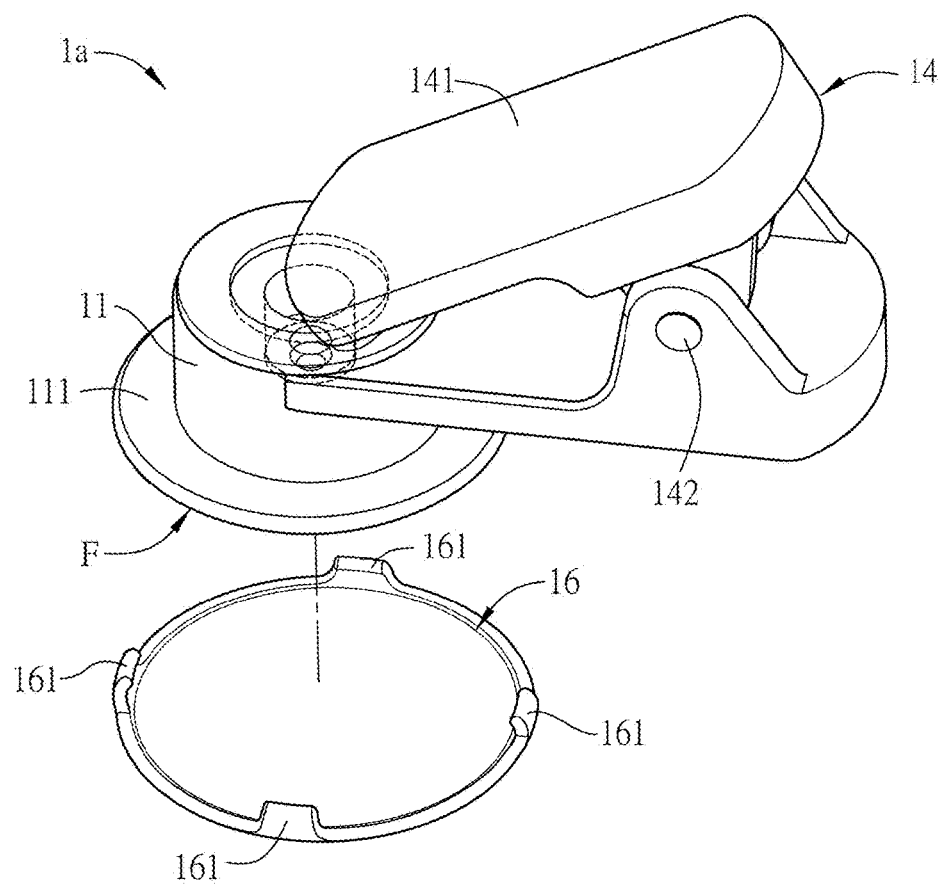
FIG. 4A is a pictorial outlook view showing a reflecting microscope module having a detachable seat cover according to an embodiment of the invention.
Figure 4B:
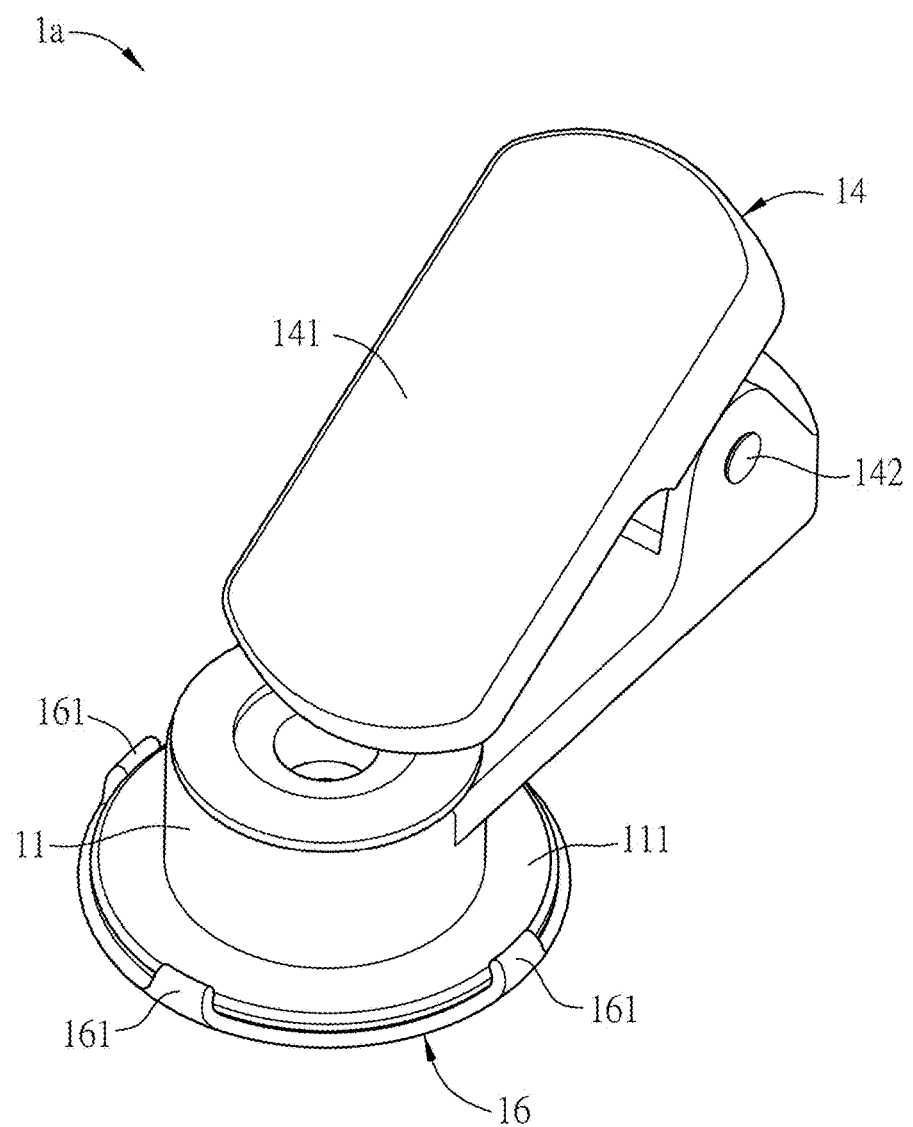
FIG. 4B is a schematic view showing the reflecting microscope module of FIG. 4A connecting the housing to the detachable seat cover.

In addition, please refer to FIGS. 4A and 4B. FIG. 4A is a pictorial outlook view showing a reflecting microscope module having a detachable seat cover according to an embodiment of the invention. FIG. 4B is a schematic view showing the reflecting microscope module of FIG. 4A connecting the housing to the detachable seat cover.

The reflecting microscope module 1a of FIG. 4A and the reflecting microscope module 1 of the previous embodiment have most of the same elements and the same relationships between the elements except for the difference that the reflecting microscope module 1a of this embodiment further comprises a detachable seat cover 16.

In this embodiment, the housing 11 and the detachable seat cover 16 are connected together by way of engaging through an engaging unit 161 of the detachable seat cover 16. As shown in FIG. 4B, the detachable seat cover 16 may engage with and cover over the bottom 111 of the housing 11, the housing 11 and the detachable seat cover 16 through the engaging unit 161, wherein a mark or a flag may be used to facilitate the alignment of the engaging unit 161. With this, because the detachable seat cover 16 covers the bottom 111 of the housing 11, the sample adhesive substance 13 disposed on the bottom 111 of the housing 11 may have the better flatness to enhance the imaging effect of the to-be-observed sample S observed by the reflecting microscope module 1a. In addition, the housing 11 and the detachable seat cover 16 in another implementation aspect may also be connected together through a thread or a magnetic unit by way of screwing or magnetic attracting. With this, the detachable seat cover 16 and the housing 11 can also be connected together to enhance the imaging effect of the to-be-observed sample S observed by the reflecting microscope module 1a in the same manner.

In addition, other technical characteristics of the reflecting microscope module 1a can be understood with reference to the associated descriptions of the reflecting microscope module 1, and detailed descriptions thereof will be omitted.

Figure 5A:
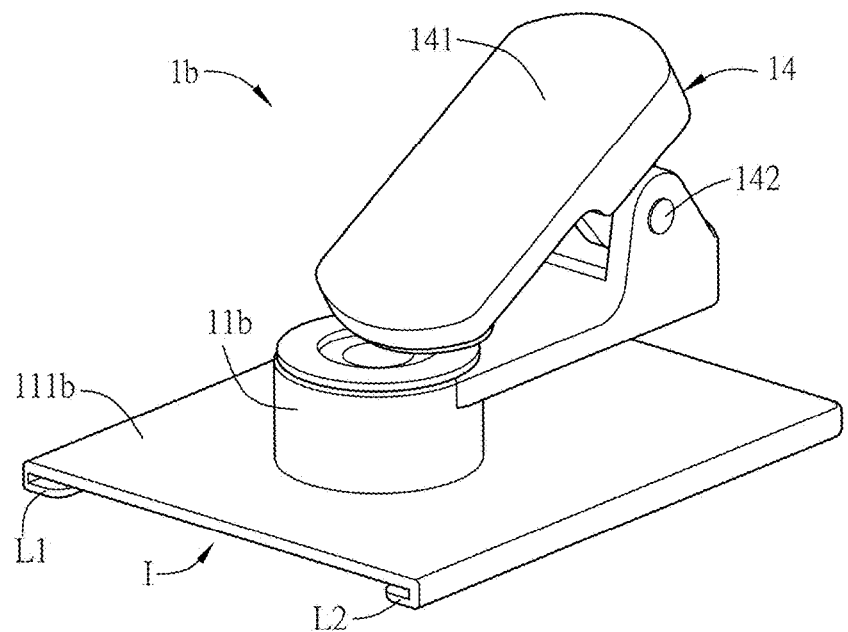
FIG. 5A is a pictorial outlook view showing a bottom of a reflecting microscope module having a sample adhesive substance insertion slot according to an embodiment of the invention.
Figure 5B:
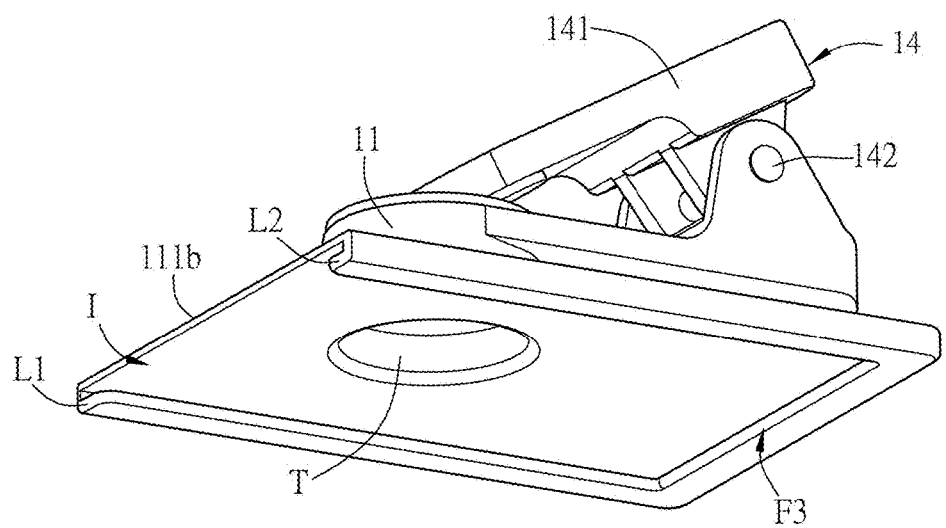
FIG. 5B is a schematic view showing the reflecting microscope module of FIG. 5A at another angle.

In addition, please refer to FIGS. 5A and 5B. FIG. 5A is a pictorial outlook view showing a bottom of a reflecting microscope module having a sample adhesive substance insertion slot according to an embodiment of the invention. FIG. 5B is a schematic view showing the reflecting microscope module of FIG. 5A at another angle.

The reflecting microscope module 1b of FIG. 5A and the reflecting microscope module 1 of the previous embodiment have most of the same elements and the same relationships between the elements except for the difference that a bottom 111b of the reflecting microscope module 1b of this embodiment has a sample adhesive substance insertion slot I. In addition, the sample adhesive substance insertion slot may further have at least one limiting strip.

In this embodiment, the bottom 111b has the sample adhesive substance insertion slot I, which further has two limiting strips L1 and L2. The sample adhesive substance 13 may be attached to the carrier 133 and disposed on the bottom 111b through the sample adhesive substance insertion slot I. Specifically speaking, the user may insert the sample adhesive substance 13 into the sample adhesive substance insertion slot I in one direction. The limiting strips L1 and L2 are provided such that the sample adhesive substance 13 can be inserted into the sample adhesive substance insertion slot I more precisely, and the sample adhesive substance 13 is free from moving in another direction other than the insertion direction. For example, if the user inserts the sample adhesive substance 13 into the sample adhesive substance insertion slot I from left to right, then the top-to-bottom direction movement of the sample adhesive substance 13 cannot occur in the inserting process. In addition, the bottom 111b of a housing 11b may have an insertion stopping surface F3 on the other end of the sample adhesive substance insertion slot I. The insertion stopping surface F3 is connected to the limiting strips L1 and L2, so that the sample adhesive substance 13 rests against the insertion stopping surface F3 without movement after being inserted into the sample adhesive substance insertion slot I.

In addition, the limiting strips L1 and L2 may be provided with at least one magnetic unit (not shown) so that the carrier 133 attached with the sample adhesive substance 13 and the sample adhesive substance insertion slot I can be magnetically attracted together through the limiting strips provided with the magnetic units. For example, the magnetic units may be disposed at positions on the limiting strips L1 and L2 near the insertion stopping surface, so that the sample adhesive substance 13 can be attracted toward the insertion stopping surface through the alignment of the limiting strips L1 and L2. In addition, the sample adhesive substance insertion slot has a transparent area or an opening area T so that the light ray can be inputted into the to-be-observed sample S on the sample adhesive substance 13 from the sample inspecting surface F1, and then reflected back to the sample inspecting surface F1, and inputted back to the lens 12 and the image capturing module 2 through the previously mentioned optical path architecture. With this, the sample adhesive substance 13 can be guided by the limiting strips and be directly inserted into the sample adhesive substance insertion slot I. In addition, the limiting strips L1 and L2 can assist the sample adhesive substance 13 in directly aligning with and inserting into the bottom of the sample adhesive substance insertion slot I, and the sample adhesive substance 13 can be moved in the left-right direction without being completely stuck. Thus, the provision of the limiting strips L1 and L2 can finely tune the position of the to-be-observed sample S in the left-right direction, so that the to-be-observed sample S can be conveniently moved to the position where the user wants to observe the sample.

In addition, other technical characteristics of the reflecting microscope module 1b can be understood with reference to the associated descriptions of the reflecting microscope module 1, and detailed descriptions thereof will be omitted.

Figure 6A:
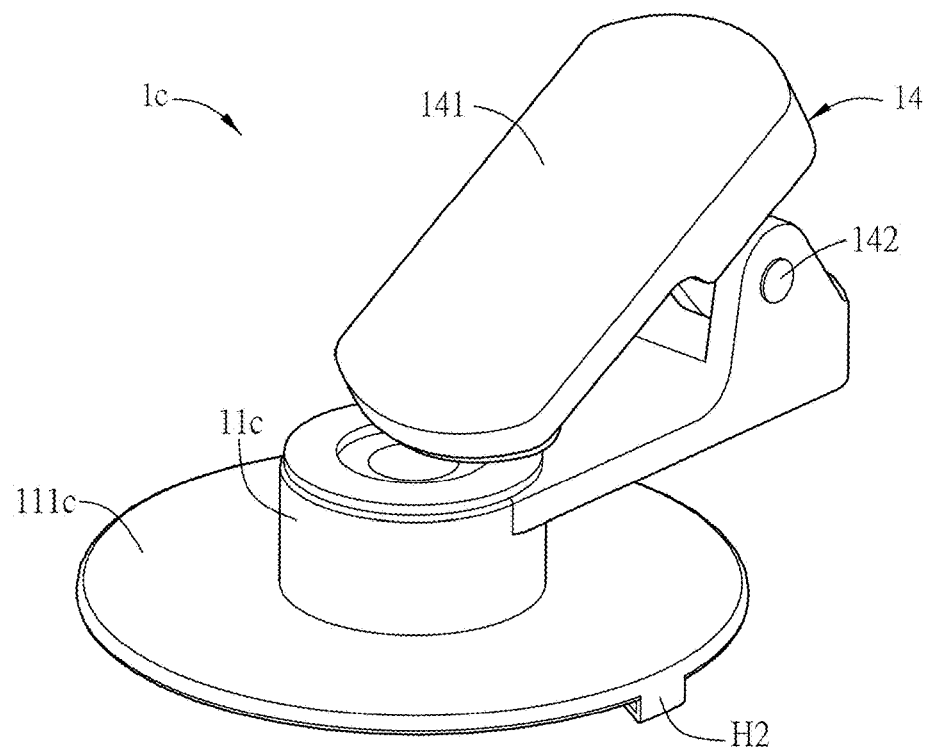
FIG. 6A is a pictorial outlook view showing a bottom of a reflecting microscope module having two sample adhesive substance fixing structures according to an embodiment of the invention.
Figure 6B:
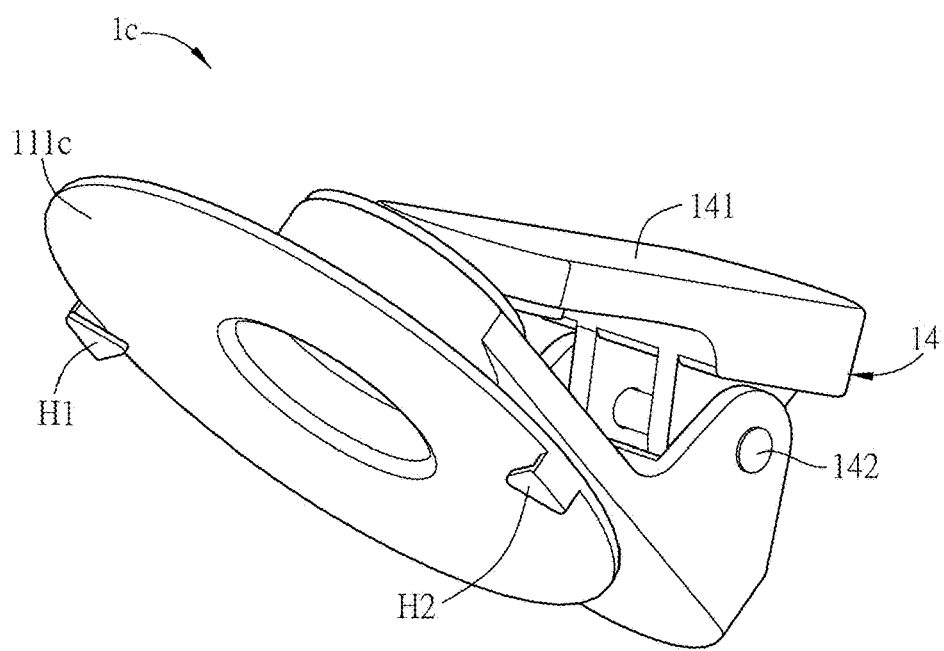
FIG. 6B is a schematic view showing the reflecting microscope module of FIG. 6A at another angle.

In addition, please refer to FIGS. 6A and 6B. FIG. 6A is a pictorial outlook view showing a bottom of a reflecting microscope module having two sample adhesive substance fixing structures according to an embodiment of the invention. FIG. 6B is a schematic view showing the reflecting microscope module of FIG. 6A at another angle.

The reflecting microscope module 1c of FIG. 6A and the reflecting microscope module 1 of the previous embodiment have most of the same elements and the same relationships between the elements except for the difference that a bottom 111c of the reflecting microscope module 1c of this embodiment has two sample adhesive substance fixing structures.

In this embodiment, because the bottom 111c has two sample adhesive substance fixing structures H1 and H2 having hook-like configurations, the sample adhesive substance 13, after being attached to the carrier 133, can be detachably disposed on the bottom 111c of a housing 11c through the two sample adhesive substance fixing structures H1 and H2, and make the sample adhesive substance 13 perform the small range of left-right movement on the bottom 111c of the housing 11c without being completely stuck by the sample adhesive substance fixing structures H1 and H2. Thus, the provision of the two sample adhesive substance fixing structures H1 and H2 can finely tune the position of the to-be-observed sample S in the left-right direction, so that the to-be-observed sample S can be conveniently moved to the position where the user wants to observe the sample. In addition, each of the sample adhesive substance fixing structures H1 and H2 of this embodiment may also be a magnetic unit, and the carrier 133 attached with the sample adhesive substance 13 may also have a magnetic unit, so that the sample adhesive substance 13 adhered with the carrier 133 can magnetically attract the two magnetic sample adhesive substance fixing structures H1 and H2 and is magnetically attracted to the bottom 111c. Specifically speaking, the sample adhesive substance fixing structures H1 and H2 may be made of a spontaneous magnetic or magnetically conductive material. The spontaneous magnetic material may be, for example, an alloy comprising a TbFe alloy, a GdCo alloy, a DyNi alloy, a NdFeB alloy or the like, or may be a ferrite material or an intermetallic compound. The magnetically conductive material may be, for example, a Co—Ni—Cr alloy, a Co—Cr—Ta alloy, a Co—Cr—Pt alloy, a Co—Cr—Pt—B alloy or the like. Thus, if the spontaneous magnetic material is used, then the magnetic force can be obtained without the external magnetic field. In addition, if the magnetically conductive material is used, the magnetic force cannot be generated until the induction with the external magnetic field (e.g., approaching the spontaneous magnetic magnet) occurs. Either the sample adhesive substance 13 or the sample adhesive substance fixing structure H1/H2 is not restricted to be made of the spontaneous magnetic or magnetically conductive material. In other words, both the sample adhesive substance 13 and the sample adhesive substance fixing structure H1/H2 may be made of the spontaneous magnetic material, or one of both is made of the spontaneous magnetic material, and the other of both is made of the magnetically conductive material as long as the magnetic force can be generated between the sample adhesive substance 13 and the sample adhesive substance fixing structure H1/H2 so that the sample adhesive substance 13 and the sample adhesive substance fixing structure H1/H2 attract each other.

In addition, other technical characteristics of the reflecting microscope module 1c can be understood with reference to the associated descriptions of the reflecting microscope module 1, and detailed descriptions thereof will be omitted.

Figure 7A:
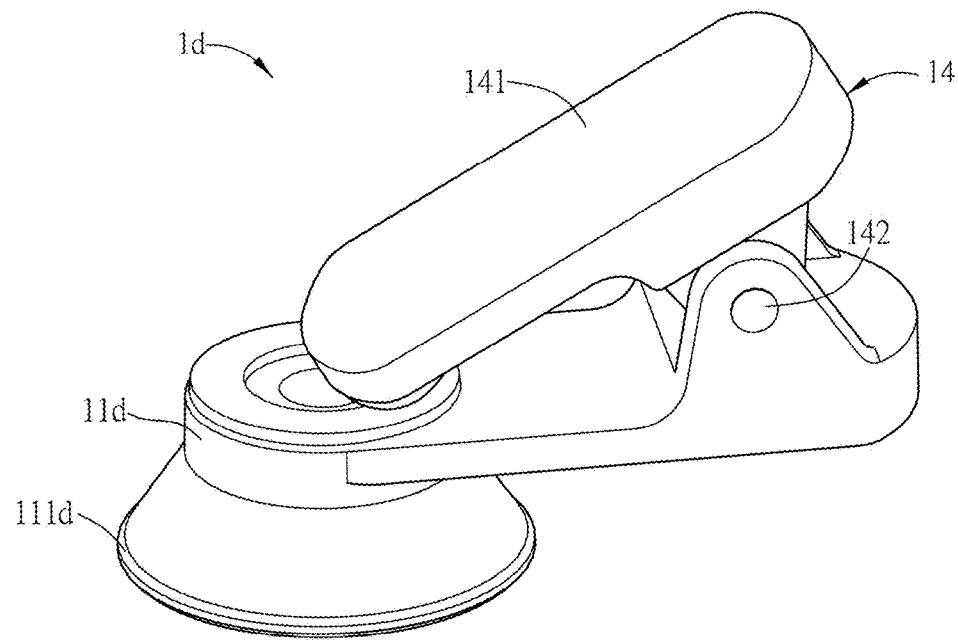
FIG. 7A is a pictorial outlook view showing a housing of a reflecting microscope module and a sample adhesive substance provided with magnetic units according to an embodiment of the invention.
Figure 7B:
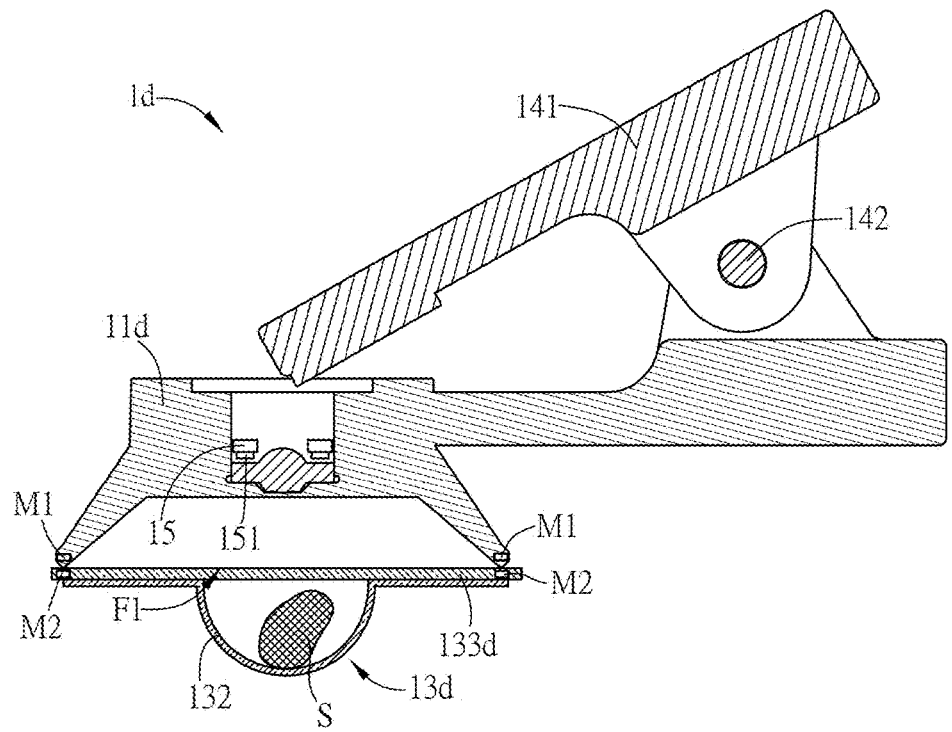
FIG. 7B is a schematic view showing the reflecting microscope module of FIG. 7A at another angle.
Figure 7C:
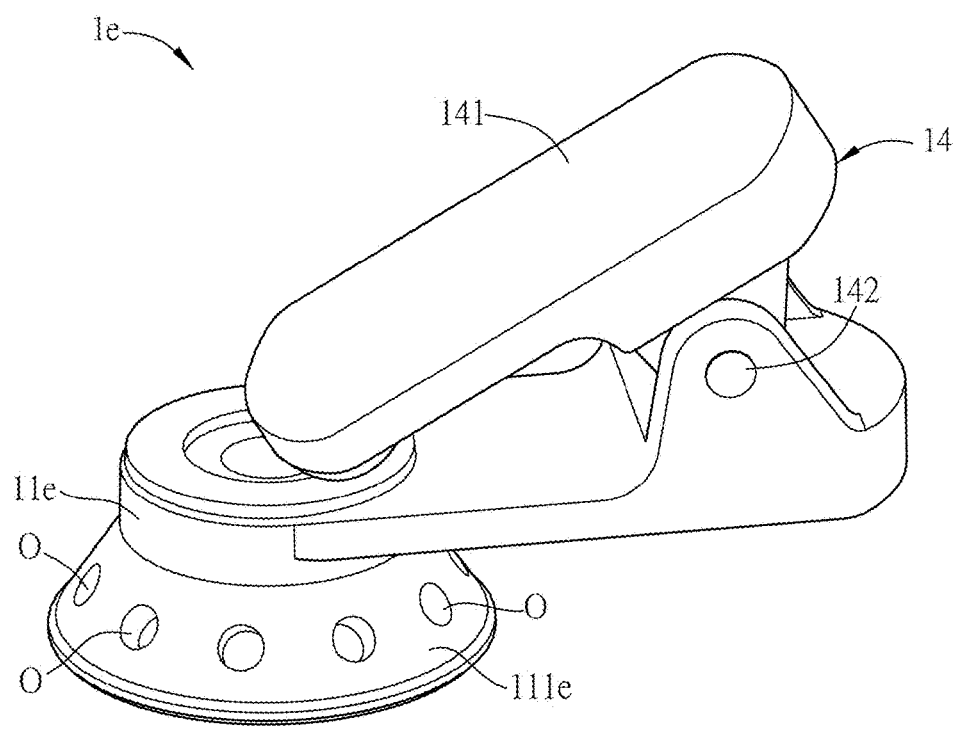
FIG. 7C is a pictorial outlook view showing the housing of the reflecting microscope module having at least one hole according to an embodiment of the invention.

In addition, please refer to FIGS. 7A to 7C. FIG. 7A is a pictorial outlook view showing a housing of a reflecting microscope module and a sample adhesive substance provided with magnetic units according to an embodiment of the invention. FIG. 7B is a schematic view showing the reflecting microscope module of FIG. 7A at another angle. FIG. 7C is a pictorial outlook view showing the housing of the reflecting microscope module having at least one hole according to an embodiment of the invention.

The reflecting microscope module 1d of FIG. 7A and the reflecting microscope module 1 of the previous embodiment have most of the same elements and the same relationships between the elements except for the difference that an outer surface of a housing 11d of the reflecting microscope module 1d of this embodiment has a slope, and at least one of the housing and the sample adhesive substance is further provided with a magnetic unit.

In this embodiment, the housing 11d of the reflecting microscope module 1d and the housing of each of the previous embodiments have different outer surfaces, and the outer surface of the housing 11d has a slope, but is not an ordinary vertical outer surface. In addition, the housing 11d and a carrier 133d of a sample adhesive substance 13d used in conjunction with the reflecting microscope module 1d are further provided with a magnetic unit. Specifically speaking, the housing 11d is provided with a magnetic unit M1 at a position nearer to the sample adhesive substance 13d, and a carrier 133d adhered with the sample adhesive substance 13d can be correspondingly provided with a magnetic unit M2 at the position near the housing 11d. Similarly, the magnetic unit M1 and the magnetic unit M2 may be made of a spontaneous magnetic or a magnetically conductive material. The spontaneous magnetic material may be, for example, an alloy comprising a TbFe alloy, a GdCo alloy, a DyNi alloy, a NdFeB alloy or the like, or may be a ferrite material or an intermetallic compound. The magnetically conductive material may be, for example, a Co—Ni—Cr alloy, a Co—Cr—Ta alloy, a Co—Cr—Pt alloy, a Co—Cr—Pt—B alloy or the like. Thus, if the spontaneous magnetic material is used, then the magnetic force can be obtained without the external magnetic field. In addition, if the magnetically conductive material is used, the magnetic force cannot be generated until the induction with the external magnetic field (e.g., approaching the spontaneous magnetic magnet) occurs. Either the magnetic unit M1 or the magnetic unit M2 is not restricted to be made of the spontaneous magnetic or magnetically conductive material. In other words, both the magnetic unit M1 and the magnetic unit M2 may be a spontaneous magnetic material, or one of both is made of the spontaneous magnetic material, and the other of both is made of the magnetically conductive material as long as the magnetic force can be generated between the magnetic unit M1 and the magnetic unit M2, and the bottom 111d and the sample adhesive substance 13d adhered to the carrier 133d can be magnetically attracted together.

It is to be noted that the magnetic force of the magnetic units M1 and M2 cannot be too large or too small. When the attractive magnetic force between the magnetic units M1 and M2 is too large, the user cannot easily separate the sample adhesive substance 13d and the carrier 133d from the bottom 111d of the housing 11d. However, if the attractive magnetic force between the magnetic units M1 and M2 is too small, then the sample adhesive substance 13d and the carrier 133d cannot be surely disposed on the bottom of the housing 11d, and the sample adhesive substance 13d cannot be adjacently connected to or tightly attached to the sample inspecting surface F1. In addition, in different embodiments, when the housing 11d is made of a metal material, such as iron, steel or nickel, the sample adhesive substance 13d and the housing 11d may directly attract together directly through the magnetic unit M2 disposed on the carrier 133d, so that the sample adhesive substance is magnetically attracted to the bottom of the housing 11d, and the magnetic unit M1 needs not to be correspondingly provided on the periphery of the housing 11d. With this and comparing the reflecting microscope module of this implementation aspect with the previous reflecting microscope module, at least one of this housing thereof and the sample adhesive substance is provided with a magnetic unit, so that one or both of them can be magnetically attracted and connected to the bottom of the housing without being restricted by the above-mentioned slot and limiting strip. This design can make the sample adhesive substance have the higher mobility and movement resilience especially when the to-be-observed sample S, such as a live sample, is not a completely stationary target to be observed. In this case, the reflecting microscope module of this embodiment may further facilitate the user in performing his or her observation.

Referring next to FIG. 7C, the reflecting microscope module of FIG. 7C and the reflecting microscope module 1 of FIG. 7A have most of the same elements and the same relationships between the elements except for the difference that the light emitting assembly is not disposed inside the housing 11e of the reflecting microscope module 1e of this embodiment. In other words, the reflecting microscope module 1e is not an aspect of an active light emitting microscope. That is, when the reflecting microscope module 1e does not cooperate with a light source (i.e., no light emitting assembly is disposed inside the housing 11e), the housing 11e of this embodiment may have at least one hole O, through which an external light ray is incident to the inside of the housing 11e and the sample inspecting surface. In addition, the invention does not intend to restrict the size and number of the hole(s) O provided on the housing 11e as long as the hole O allows the external light ray to enter the above-mentioned optical path architecture through the housing 11e, and finally enter the lens of the image capturing module 2 similarly. Thus, even if the reflecting microscope module is not the active light emitting aspect, the user may also utilize the hole formed on the housing to guide the light ray from the outside, and may also clearly observe the sample image magnified by the reflecting microscope module.

In addition, other technical characteristics of the reflecting microscope modules 1d and 1e can be understood with reference to the associated descriptions of the reflecting microscope module 1, and detailed descriptions thereof will be omitted.

Figure 8A:
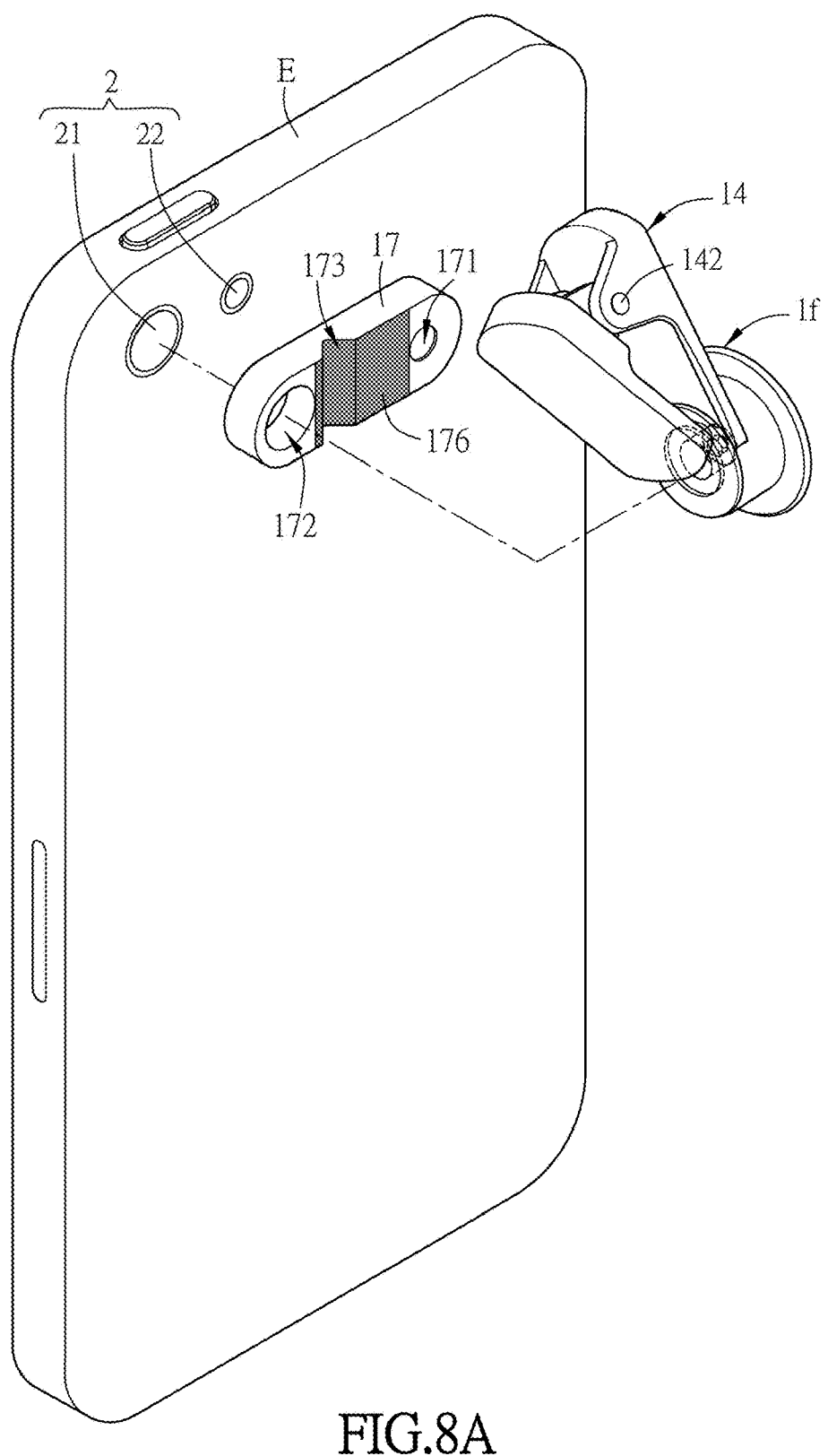
FIG. 8A is a pictorial outlook view showing an outer portion of a housing of a reflecting microscope module provided with a light-guiding element according to an embodiment of the invention.
Figure 8B:
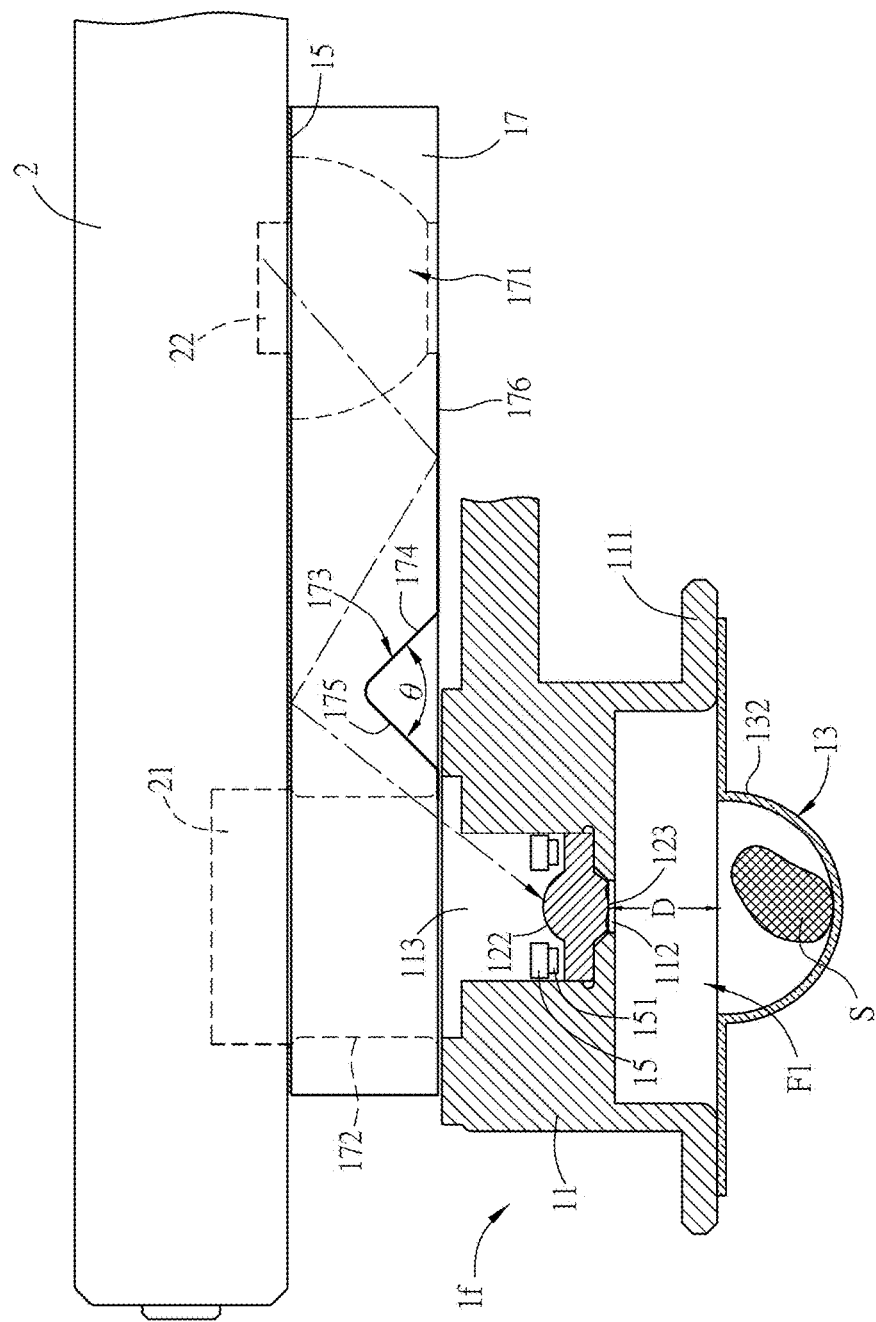
FIG. 8B is a schematically cross-sectional view showing the reflecting microscope module of FIG. 8A upon sample observation.

In addition, please refer to FIG. 8A and FIG. 8B. FIG. 8A is a pictorial outlook view showing an outer portion of a housing of a reflecting microscope module provided with a light-guiding element according to an embodiment of the invention. FIG. 8B is a schematically cross-sectional view showing the reflecting microscope module of FIG. 8A upon sample observation.

The reflecting microscope module if of FIG. 8 and the reflecting microscope module 1 of the previous embodiment have most of the same elements and the same relationships between the elements except for the difference that the reflecting microscope module 1f of this embodiment does not have the light emitting assembly, but a light-guiding element is disposed on the outside of the housing.

Referring to FIGS. 8A and 8B concurrently, no light emitting assembly is disposed inside the housing 11 in the reflecting microscope module if of this embodiment, and a light-guiding element 17 is disposed on the outside of the housing 11. The light-guiding element 17 is disposed adjacently to the convex lens 12, and guides the light source outside the housing 11 of the reflecting microscope module if to the convex lens 12. Specifically, the light-guiding element 17 of this embodiment has a light input portion 171 and a light output portion 172, which is located between the image capturing module 2 and the convex lens 12. The light input portion 171 receives a light ray, which may come from the environment light or a flash 22 of the image capturing module 2. In this example embodiment, the light ray comes from the flash 22 of the image capturing module 2, so the position of the light input portion 171 is disposed adjacently to the flash 22 of the image capturing module 2. Preferably, the top surface of the light input portion 171 may have an opening for receiving the light coming from the flash 22 or environment. After the light input portion 171 of the light-guiding element 17 receives the light ray from the flash 22, the light ray is outputted from the light output portion 172 to the convex lens 12.

Specifically, the overall appearance of the light-guiding element 17 may be a strip-like or an annular structure. For example, the light input portion 171 of this embodiment receives the light ray from the flash 22, so the position of the light input portion 171 needs to correspond to the flash 22, and the position of the light output portion 172 corresponds to the lens 21 of the image capturing module 2. Because the lens 21 of the image capturing module 2 and the flash 22 are frequently disposed and separated by a distance, the overall appearance of the light-guiding element 17 is in the form of a strip-like structure. Of course, in other embodiments, if the light input portion 171 receives the environment light, then the overall appearance of the light-guiding element 17 may be the annular structure, and the invention is not restricted thereto.

Preferably, the light input portion 171 may be a hemispherical or arced structure for receiving the larger range of light source. Preferably, the light-guiding element 17 has a groove 173. As shown in FIG. 8B, the groove 173 has a first inclined surface 174 and a second inclined surface 175 forming an angle θ therebetween, wherein the angle ranges between 45 and 120 degrees. With the design of the groove 173, the light ray received by the light input portion 171 can be effectively guided to the light output portion 172, and outputted from the light output portion 172 to the convex lens 12. Preferably, as shown in FIGS. 8A and 8B, the light-guiding element 17 may have a light-obstructing layer 176, which may be a dark paint coated between the light input portion 171 and the light output portion 172 to prevent stray light in the environment from entering the light output portion 172.

According to the above-mentioned arrangement relationship, the light ray outputted from the light output portion 172 can be inputted from the light input surface 122 of the convex lens 12, and outputted to the sample inspecting surface F1 from a light output surface 123 of the convex lens. Correspondingly, the housing 11 of this embodiment similarly has the light output hole 112 and the opening 113. The light output hole 112 is located on the side near the sample inspecting surface F1, and the opening 113 is located on the side near the image capturing module 2. Thus, the overall path of the light ray outputted from the light output portion 172 is such that the light ray is inputted from the light input surface 122 of the convex lens 12, and outputted from the light output surface 123, and then outputted to the sample inspecting surface F1 through the light output hole 112. Next, after the light ray is reflected from the sample inspecting surface F1, the light ray is inputted from the light output surface 123 of the convex lens 12, is outputted from the light input surface 122, passes through the opening 113 and the light output portion 172, and is then inputted to the lens 21 of the image capturing module 2. After the lens 21 of the image capturing module 2 obtains the magnified sample image, the image capturing module 2 performs the image processing procedure, and the display unit of the electronic device E may display the sample image. That is, the sample image is magnified by the reflecting microscope module 1 so that the user can directly observe the sample image magnified by the reflecting microscope module 1 at the end of the electronic device E.

In addition, other technical characteristics of the reflecting microscope module if can be understood with reference to the associated descriptions of the reflecting microscope module 1, and detailed descriptions thereof will be omitted.

In addition, the invention further provides a reflecting microscope device comprising an image capturing module and the reflecting microscope module in one of the embodiments.

In summary, the reflecting microscope module of the invention cooperates with an image capturing module. The reflecting microscope module comprises a housing, a lens and a sample adhesive substance. The housing has a sample inspecting surface located on one side of the housing opposite to the image capturing module. The lens is disposed inside the housing. The sample adhesive substance is detachably disposed on a bottom of the housing, is adjacently connected to the sample inspecting surface and comprises a substrate and a glue layer. The glue layer is combined with the substrate to form one piece. The structural design of the invention, in which a sample adhesive substance is detachably disposed on a bottom of a housing of the reflecting microscope module so that the sample adhesive substance is adjacently connected to the sample inspecting surface, is used so that the sample can be easily and rapidly fixed to and disposed on the microscope to facilitate the user's observation. Thus, the objects of lowering the difficulty of operating the microscope, making the user easily and instinctively get started and enhancing the user's will of operating the microscope can be achieved.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A reflecting microscope module cooperating with an image capturing module for observing a sample, the reflecting microscope module comprising:
    a housing having a sample inspecting surface located on one side of the housing opposite to the image capturing module;
    a lens disposed in the housing; and
    a sample adhesive substance, which is detachably disposed on a bottom of the housing, is adjacently connected to the sample inspecting surface and comprises:
        a substrate having a surface at a side of the substrate, the side of the substrate facing the lens; and
        a glue layer at least partially and directly disposed on the surface of the substrate, and integrally combined with the substrate to form one piece,
    wherein the substrate of the sample adhesive substance is detachably attached onto the bottom of the housing by the glue layer, and thus a chamber is formed between the substrate and the bottom of the housing for accommodating the sample, the glue layer is disposed between the surface of the substrate and the bottom of the housing, the glue layer and the sample are both disposed at the side of the substrate facing the lens.

2. The reflecting microscope module according to claim 1, wherein a light ray is reflected by the sample adhesive substance and then penetrates through the lens and reaches the image capturing module.

3. The reflecting microscope module according to claim 1, wherein a light ray outputted from a light source is inputted from a light input surface of the lens, and is outputted from a light output surface of the lens to the sample inspecting surface.

4. The reflecting microscope module according to claim 1, further comprising:
    a light emitting assembly, which has a light source and is disposed adjacently to the lens.

5. The reflecting microscope module according to claim 4, wherein the light source of the light emitting assembly is an annular light emitting source.

6. The reflecting microscope module according to claim 1, further comprising:
    a light-guiding element disposed outside the housing, wherein the light-guiding element has a light input portion and a light output portion, and the light output portion is disposed adjacently to the lens, so that the light input portion receives a light ray and the light output portion emits the light ray to the lens.

7. The reflecting microscope module according to claim 1, wherein when the reflecting microscope module is not used in conjunction with a light source, and the housing has at least one hole to make an external light ray travel into the housing and onto the sample inspecting surface.

8. The reflecting microscope module according to claim 1, wherein the surface of the substrate has a concave portion and an extension, and the extension is adjacently connected to the concave portion.

9. The reflecting microscope module according to claim 8, wherein an adhesive property of the glue layer located on the concave portion is lower than an adhesive property of the glue layer located on the extension.

10. The reflecting microscope module according to claim 8, wherein at least a partial area of the sample adhesive substance is a light-permeable area.

11. The reflecting microscope module according to claim 10, wherein the extension is an opaque area, and the concave portion is a light-permeable area.

12. The reflecting microscope module according to claim 8, wherein the sample adhesive substance is a sticker.

13. The reflecting microscope module according to claim 1, wherein the reflecting microscope module further comprises a detachable seat cover, and the housing and the detachable seat cover are connected together through a thread, an engaging unit or a magnetic unit by way of screwing, engaging or magnetic attracting.

14. The reflecting microscope module according to claim 1, wherein the bottom has two sample adhesive substance fixing structures.

15. The reflecting microscope module according to claim 1, further comprising:
    a connector disposed on the housing and connected to the image capturing module.

16. The reflecting microscope module according to claim 1, wherein a shortest distance from the sample inspecting surface to the lens ranges between 0.1 mm to 10.0 mm.

17. The reflecting microscope module according to claim 1, wherein the substrate has a smooth surface without a concave portion.

18. A reflecting microscope device, comprising:
    an image capturing module; and
    the reflecting microscope module according to claim 1.

19. A reflecting microscope module cooperating with an image capturing module for observing a sample, the reflecting microscope module comprising:
    a housing having a sample inspecting surface located on one side of the housing opposite to the image capturing module;
    a lens disposed in the housing;
    a carrier disposed on the bottom of the housing and adjacently connected to the sample inspecting surface; and a sample adhesive substance, which is detachably disposed on the carrier, and comprises:
  a substrate having a surface at a side of the substrate, the side of the substrate facing the lens; and
  a glue layer at least partially and directly disposed on the surface of the substrate, and integrally combined with the substrate to form one piece,
wherein the substrate of the sample adhesive substance is detachably attached onto the carrier by the glue layer, and thus a chamber is formed between the substrate and the carrier for accommodating the sample, the glue layer is disposed between the surface of the substrate and the carrier, the glue layer and the sample are both disposed at the side of the substrate facing the lens.

20. The reflecting microscope module according to claim 19, wherein the bottom has two sample adhesive substance fixing structures, the sample adhesive substance fixing structure is a magnetic unit, and the sample adhesive substance adhered to the carrier is magnetically attracted to the bottom through the magnetic unit.

\* \* \* \* \*